US011797929B2

United States Patent
Bryan et al.

(10) Patent No.: US 11,797,929 B2
(45) Date of Patent: *Oct. 24, 2023

(54) SYSTEM AND METHOD FOR PERPETUAL INVENTORY MANAGEMENT

(71) Applicant: Walmart Apollo, LLC, Bentonville, AR (US)

(72) Inventors: Greg A. Bryan, Centerton, AR (US); Cristy C. Brooks, Cassville, MO (US); David Blair Brightwell, Bella Vista, AR (US); Benjamin D. Enssle, Bella Vista, AR (US); Matthew A. Jones, Bentonville, AR (US); Jesse L. Eaton, Springdale, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 220 days.

This patent is subject to a terminal disclaimer.

(21) Appl. No.: 17/341,549

(22) Filed: Jun. 8, 2021

(65) Prior Publication Data
US 2021/0295253 A1 Sep. 23, 2021

Related U.S. Application Data

(63) Continuation of application No. 15/916,829, filed on Mar. 9, 2018, now Pat. No. 11,055,662.
(Continued)

(51) Int. Cl.
*G06Q 10/08* (2023.01)
*G06Q 10/06* (2023.01)
(Continued)

(52) U.S. Cl.
CPC ..... *G06Q 10/0875* (2013.01); *G06F 16/2358* (2019.01); *G06Q 10/06315* (2013.01)

(58) Field of Classification Search
CPC .......... G06Q 10/0875; G06Q 10/06315; G06F 16/2358
See application file for complete search history.

(56) References Cited

U.S. PATENT DOCUMENTS

| 5,963,919 A | 10/1999 | Brinkley |
| 6,681,990 B2 | 1/2004 | Vogler |

(Continued)

FOREIGN PATENT DOCUMENTS

| CA | 2682886 | 4/2010 |
| CN | 204270352 U | 4/2015 |

(Continued)

OTHER PUBLICATIONS

"Improve Productivity and Customer Service in the Retail Store With Automated Inventory Management: The MC2100 in retail"; Zebra Technologies; Apr. 2015; pp. 1-6.
(Continued)

*Primary Examiner* — Paul Danneman
(74) *Attorney, Agent, or Firm* — Fitch, Even, Tabin & Flannery LLP

(57) ABSTRACT

A perpetual inventory (PI) value associated with the selected product and a last PI adjustment time that indicates when the retail store last adjusted the PI value are received. The PI value of the selected product is compared to the back room quantity value of the selected product, and a time when the back room quantity value becomes greater than the PI value for the selected product is determined. An adjustment to the PI of the selected product is blocked when the PI adjustment time is after the time. When the back room quantity value is greater than the PI value and the adjustment to the PI value is unblocked, the PI value is adjusted to be the back room quantity value.

16 Claims, 3 Drawing Sheets

Related U.S. Application Data

(60) Provisional application No. 62/471,420, filed on Mar. 15, 2017.

(51) Int. Cl.
  *G06F 16/23* (2019.01)
  *G06Q 10/0875* (2023.01)
  *G06Q 10/0631* (2023.01)

(56) References Cited

U.S. PATENT DOCUMENTS

| | | | |
|---|---|---|---|
| 6,726,099 | B2 | 4/2004 | Becker |
| 6,758,403 | B1 | 7/2004 | Keys |
| 7,084,769 | B2 | 8/2006 | Bauer |
| 7,222,786 | B2 | 5/2007 | Renz |
| 7,370,005 | B1 | 5/2008 | Ham |
| 7,480,623 | B1 | 1/2009 | Landvater |
| 7,552,066 | B1 | 6/2009 | Landvater |
| 7,616,117 | B2 | 11/2009 | Streeb |
| 7,693,757 | B2 | 4/2010 | Zimmerman |
| 7,788,119 | B2 | 8/2010 | Najmi |
| 7,792,709 | B1 | 9/2010 | Trandal |
| 7,950,579 | B2 | 5/2011 | Gray |
| 7,954,712 | B2 | 6/2011 | Babcock |
| 8,091,782 | B2 | 1/2012 | Cato |
| 8,107,736 | B2 | 1/2012 | Brown |
| 8,189,855 | B2 | 5/2012 | Opalach |
| 8,191,672 | B2 | 6/2012 | Kondo |
| 8,195,533 | B1 | 6/2012 | Mishra |
| 8,224,717 | B2 | 7/2012 | Giacobbe |
| 8,260,456 | B2 | 9/2012 | Siegel |
| 8,321,302 | B2 | 11/2012 | Bauer |
| 8,321,303 | B1 | 11/2012 | Krishnamurthy |
| 8,346,630 | B1 | 1/2013 | McKeown |
| 8,423,431 | B1 | 4/2013 | Rouaix |
| 8,521,620 | B2 | 8/2013 | Livingston |
| 8,577,136 | B1 | 11/2013 | Ascher |
| 8,616,822 | B2 | 12/2013 | Winkler |
| 8,732,039 | B1 | 5/2014 | Chen |
| 8,965,796 | B1 | 2/2015 | Gala |
| 9,120,622 | B1 | 9/2015 | Elazary |
| 9,165,277 | B2 | 10/2015 | Jones |
| 9,171,278 | B1 | 10/2015 | Kong |
| 9,205,886 | B1 | 12/2015 | Hickman |
| 9,280,757 | B2 | 3/2016 | Parpia |
| 9,378,484 | B1 | 6/2016 | Russell |
| 9,415,935 | B1 | 8/2016 | MacFarlane |
| 9,758,301 | B2 | 9/2017 | Porat |
| 10,019,803 | B2 | 7/2018 | Venable |
| 10,089,055 | B1 | 10/2018 | Fryman |
| 10,130,177 | B2 | 11/2018 | Jones |
| 10,130,232 | B2 | 11/2018 | Atchley |
| 10,138,060 | B1 | 11/2018 | Mantha |
| 10,169,738 | B2 | 1/2019 | Jones |
| 10,189,642 | B2 | 1/2019 | High |
| 10,192,157 | B2 | 1/2019 | Cote |
| 10,289,990 | B2 | 5/2019 | Rizzolo |
| 10,311,400 | B2 | 6/2019 | Mascorro Medina |
| 10,360,548 | B2 | 7/2019 | Brooks |
| 10,373,116 | B2 | 8/2019 | Medina |
| 10,453,009 | B2 | 10/2019 | Ulrich |
| 10,467,587 | B2 | 11/2019 | Bogolea |
| 10,489,677 | B2 | 11/2019 | Rzeszutek |
| 10,505,057 | B2 | 12/2019 | Haist |
| 10,546,258 | B2 | 1/2020 | Jones |
| 10,552,792 | B2 | 2/2020 | Mattingly |
| 10,558,947 | B2 | 2/2020 | Bryan |
| 11,055,662 | B2 * | 7/2021 | Bryan .......... G06Q 10/06315 |
| 2001/0047293 | A1 | 11/2001 | Waller |
| 2002/0138336 | A1 | 9/2002 | Bakes |
| 2002/0174001 | A1 | 11/2002 | Henry |
| 2003/0216969 | A1 | 11/2003 | Bauer |
| 2003/0233277 | A1 | 12/2003 | Saunders |
| 2004/0158507 | A1 | 8/2004 | Meek |
| 2006/0157150 | A1 | 7/2006 | Blakeslee |
| 2007/0021864 | A1 | 1/2007 | Mountz |
| 2007/0144991 | A1 | 6/2007 | Hansl |
| 2008/0077510 | A1 | 3/2008 | Dielemans |
| 2008/0120205 | A1 | 5/2008 | Hoopes |
| 2008/0255968 | A1 | 10/2008 | Heinrichs |
| 2008/0270269 | A1 | 10/2008 | Myers |
| 2009/0060349 | A1 | 3/2009 | Linaker |
| 2009/0063310 | A1 | 3/2009 | Alonzo |
| 2009/0101713 | A1 | 4/2009 | Ulrich |
| 2009/0157533 | A1 | 6/2009 | Ohno |
| 2010/0106609 | A1 | 4/2010 | Sherman |
| 2010/0138037 | A1 | 6/2010 | Adelberg |
| 2012/0209734 | A1 | 8/2012 | Brooks |
| 2012/0259655 | A1 | 10/2012 | Madreperla |
| 2012/0310781 | A1 | 12/2012 | Battle |
| 2013/0018696 | A1 | 1/2013 | Meldrum |
| 2013/0211870 | A1 | 8/2013 | Lawson |
| 2014/0006131 | A1 | 1/2014 | Causey |
| 2014/0006229 | A1 | 1/2014 | Birch |
| 2014/0100769 | A1 | 4/2014 | Wurman |
| 2014/0143039 | A1 | 5/2014 | Branton |
| 2014/0180865 | A1 | 6/2014 | Argue |
| 2014/0201042 | A1 | 7/2014 | Meyer |
| 2014/0247116 | A1 | 9/2014 | Davidson |
| 2014/0344118 | A1 | 11/2014 | Parpia |
| 2014/0379535 | A1 | 12/2014 | Briet |
| 2015/0039373 | A1 | 2/2015 | Anand |
| 2015/0178654 | A1 | 6/2015 | Glasgow |
| 2015/0235157 | A1 | 8/2015 | Avegliano |
| 2015/0242805 | A1 | 8/2015 | Sakurai |
| 2015/0379366 | A1 | 12/2015 | Nomura |
| 2016/0042315 | A1 | 2/2016 | Field-Darragh |
| 2016/0114488 | A1 | 4/2016 | Mascorro Medina |
| 2016/0132823 | A1 | 5/2016 | Swafford |
| 2016/0132910 | A1 | 5/2016 | Appel |
| 2016/0171428 | A1 | 6/2016 | Gooijer |
| 2016/0371613 | A1 | 12/2016 | Ulrich |
| 2017/0148005 | A1 | 5/2017 | Murn |
| 2017/0155788 | A1 | 6/2017 | Kobayashi |
| 2017/0193430 | A1 | 7/2017 | Barreira Avegliano |
| 2017/0200106 | A1 | 7/2017 | Jones |
| 2018/0005174 | A1 | 1/2018 | Dixon |
| 2018/0060804 | A1 | 3/2018 | Cheruku |
| 2018/0089613 | A1 | 3/2018 | Chen |
| 2018/0268355 | A1 | 9/2018 | Bryan |
| 2018/0268356 | A1 | 9/2018 | Bryan |
| 2018/0268364 | A1 | 9/2018 | Bryan |
| 2018/0268366 | A1 | 9/2018 | Bryan |
| 2018/0268367 | A1 | 9/2018 | Bryan |
| 2018/0268509 | A1 | 9/2018 | Bryan |
| 2018/0341906 | A1 | 11/2018 | Bryan |
| 2019/0073775 | A1 | 3/2019 | Lam |
| 2019/0149725 | A1 | 5/2019 | Adato |
| 2019/0215424 | A1 | 7/2019 | Adato |
| 2019/0291954 | A1 | 9/2019 | Lee |
| 2019/0303863 | A1 | 10/2019 | Ghosh |

FOREIGN PATENT DOCUMENTS

| | | |
|---|---|---|
| EP | 1901215 | 3/2008 |
| WO | 2015184286 | 12/2015 |
| WO | 2016109251 | 7/2016 |

OTHER PUBLICATIONS

"Shelf Monitor"; Tech Mahindra; https://www.techmahindra.com/industries/Enterprise/retail_and_cpg/retail/solutions/shelf_monitor.aspx; 2016; pp. 1-1.

Angell, Robert C., "Control of State-Wide Liquor Inventories", National Association of Cost Accountants; NACA Bulletin (pre-1986); Feb. 15, 1948; pp. 1-9.

Bourzac, Katherine; "A Robot Takes Stock"; https://www.technologyreview.com/s/428374/arobottakesstock/; Published Jun. 29, 2012; pp. 1-4.

Fraunhofer; "The flying inventory assistant"; http://www.fraunhofer.de/en/press/research-news/2014/december/the-flying-inventoryassistant.html; Published Dec. 1, 2014; pp. 1-3.

(56) References Cited

OTHER PUBLICATIONS

Gruen, Thomas W., et al.; "A Comprehensive Guide to Retail Out-of-Stock Reduction in the Fast-Moving Consumer Goods Industry"; 2007; 71 pgs.

Kang, Yun, et al.; "Information Inaccuracy in Inventory Systems—Stock Loss and Stockout"; Massachusetts Institute of Technology; Published Aug. 23, 2004; 29 pages.

Lowe's Home Improvement; "Lowe's Introduces LoweBot"; https://www.youtube.com/watch?v=hP3yfGHTXFo; Published on Aug. 30, 2016; pp. 1-10.

McClain, John O; Cornell University; "Simulating Inventory Control with Orders that Cross during Lead Time"; http://www.exinfm.com/excel%20files/Inventory_Simulation.xls; Mar. 22, 2002; pp. 1-60.

Moyer, Ted; TotalRetail; "5 Steps to Solving the Out-of-Stock Problem"; http://www.mytotalretail.com/article/5stepstosolvingtheoutofstockproblem/; Published Apr. 19, 2016; pp. 1-7.

SAP; "How to Set Up and Manage a Perpetual Inventory System"; SAP; Jun. 22, 2016; pp. 1-108.

Stuart, Sophia; "Meet Tally, the Robot That Knows What's on Store Shelves"; http://in.pcmag.com/roboticsautomation/99587/news/meettallytherobotthatknowswhatsonstoreshelves; Published Jan. 27, 2016; pp. 1-8.

Trujillo, Paul; "Walmart is Addressing Inventory Problems With a New System"; http://www.waspbarcode.com/buzz/walmart-2/; Nov. 15, 2016; pp. 1-7.

Vanian, Jonathan; "Target's New Robot Helper Is Busy at Work on Aisle 3"; http://fortune.com/2016/04/28/targettestingrobotinventorysimbe/; Published Apr. 28, 2016; pp. 1-8.

Wharton School; "Robot Assistants in Aisle 10: Will Shoppers Buy It?"; http://knowledge.wharton.upenn.edu/article/robots-aisle-10-will-shoppers-like/; Published Sep. 7, 2016; pp. 1-5.

* cited by examiner ary SYSTEM AND METHOD FOR PERPETUAL
INVENTORY MANAGEMENT

CROSS-REFERENCE TO RELATED
APPLICATION

This application is a continuation of U.S. application Ser. No. 15/916,829 filed Mar. 9, 2018, which claims the benefit of the following U.S. Provisional Application No. 62/471,420 filed Mar. 15, 2017, both of which are incorporated herein by reference in their entireties.

TECHNICAL FIELD

This invention relates generally to the management of perpetual inventory (PI) values, and more particularly, to adjusting the PI values based upon activity in the store such as in the back room of the store.

BACKGROUND

Stores utilize various measures to keep track of and manage products. One such measure is the perpetual inventory (PI) value associated with a product. In aspects, the PI value represents the quantity of product in the store. The PI value typically changes over time so as to accurately reflect the number of actual products in the store. For instance, products are purchased by customers and removed from the store affecting the PI value. Shipments arrive at the store and include additional products also affecting the PI value.

Sometimes the PI value does not accurately reflect the correct number of products in the store. This can happen for a variety of reasons including the mis-scanning products as the products leave or depart the store, or other forms of human error. If the PI value is incorrect, then various problems can develop. For instance, shipments can be ordered at the wrong times and for the wrong quantity of products.

Products are often stored in a back room of a store before being moved to a retail shelf for customers to purchase. The number of products in the back room may be separately tracked, and this number should be consistent with the PI value. Unfortunately, sometimes the back room value and the PI value become out-of-synch. For instance, the PI value for a product may be zero, but the back room quantity value may indicate product availability in the back room. This can also create some of the above-mentioned problems.

BRIEF DESCRIPTION OF THE DRAWINGS

Disclosed herein are embodiments of systems, apparatuses and methods pertaining to managing PI values. This description includes drawings, wherein.

Figure 1:
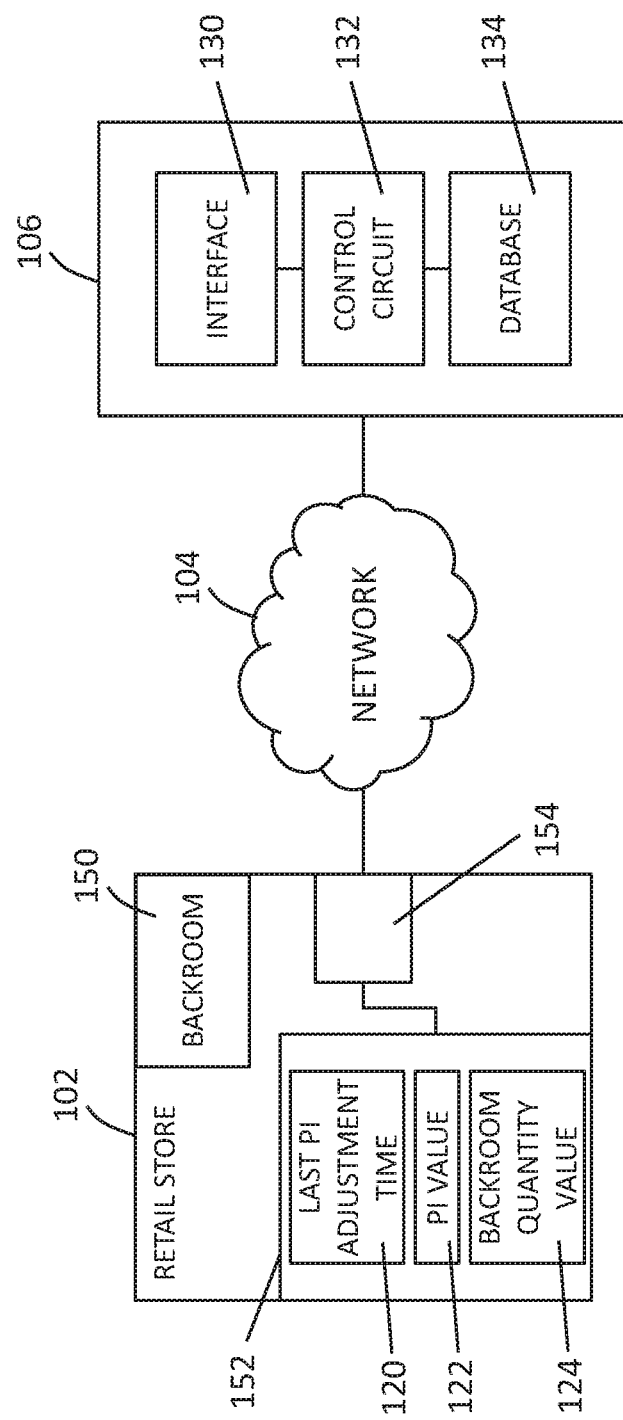
FIG. 1 is a block diagram of a system for adjusting a PI value in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, systems, apparatuses and methods are provided that change a PI value with a high degree of confidence that the change in PI value is accurate. When changed, the PI value is brought into alignment with a back room quantity value for a selected product. In these regards, PI adjustments are blocked under certain circumstances, but allowed to be made in other circumstances. Advantageously, the approaches provided herein maintain accurate PI values with a high degree of confidence in the accuracy of the PI value for products in retail stores.

In some of these embodiments, a system is configured to manage perpetual inventory (PI) values of products in a back room or other area of a retail store. The back room is not being accessible to the general public. The system includes an interface, a database, and a control circuit.

The interface is configured to receive from the retail store a back room quantity value for a selected product in the back room. The back room quantity value is obtained from scans of the selected product in the back room of the retail store. The interface is also configured to receive from the retail store a perpetual inventory (PI) value associated with the selected product, and a last PI adjustment time that indicates when the retail store last adjusted the PI value.

The database stores the PI value, the back room quantity value, and the PI adjustment time. The database can be any type of memory storage device.

The control circuit is coupled to the interface and the database. The control circuit is configured to obtain the PI value, the back room quantity value, and the last PI adjustment time from the database. The control circuit is additionally configured to compare the PI value of the selected product to the back room quantity value of the selected product, and to determine a second time when the back room quantity value becomes greater than the PI value for the selected product.

The control circuit is configured to block an adjustment to the PI of the selected product when an indication of upcoming inventory adjustment for the selected product has been received at the interface. The control circuit is also configured to block the adjustment to the PI value of the selected product when the last PI adjustment time is after the second time. When the back room quantity value is greater than the PI value and the adjustment to the PI value is unblocked, the control circuit is configured to adjust the PI value to be the back room quantity value.

In aspects, the control circuit is configured to transmit the adjusted PI value to the retail store. In other aspects, when the adjustment to the PI value is unblocked, the control circuit sends a message to send at least some of the selected product to a distribution center or another retail store.

In other examples, when the adjustment to the PI value is unblocked, the control circuit sends an alert message to a store employee. In other aspects, the retail store and the interface are connected to a cloud network.

In still other aspects, the retail store sends a plurality of data records including PI values and back room quantity value of products. In some examples, the control circuit only processes the data records in a batch mode after a number of records is received. The number may change over time or be fixed.

In others of these embodiments, a back room quantity value for a selected product in the back room is received from a retail store. The back room quantity value is obtained from scans of the selected product in the back room of the retail store. A perpetual inventory (PI) value associated with the selected product and a last PI adjustment time that indicates when the retail store last adjusted the PI value are also received from the retail store.

The back room quantity value, and the PI adjustment time are stored in a database. The PI value, the back room quantity value, and the last PI adjustment time are subsequently obtained from the database. The PI value of the selected product is compared to the back room quantity value of the selected product, and a second time when the back room quantity value becomes greater than the PI value for the selected product is determined.

An adjustment to the PI of the selected product is blocked when an indication of upcoming inventory adjustment for the selected product has been received. An adjustment to the PI value of the selected product is also blocked when the PI adjustment time is after the second time. When the back room quantity value is greater than the PI value and the adjustment to the PI value is unblocked, the PI value is adjusted to be the back room quantity value.

In still others of these embodiments, a system is configured to manage perpetual inventory (PI) values of products in a back room or other area of a retail store. The back room, in some aspects, is an area (e.g., an enclosed area) that is not being accessible to the general public. The system includes one or more sensors, a transceiver circuit, a network, an interface, a database, and a control circuit.

The one or more sensors are disposed at a back room of a retail store. The sensors are configured to obtain scans of products in the back room.

The transceiver circuit is disposed at the retail store and is configured to transmit the scans over the network. The network is coupled to the transceiver circuit.

The interface is disposed at a central location, is coupled to the network, and is configured to receive the scans. The database is disposed at the central location and stores a perpetual inventory (PI) value for the selected product, the scans, and a last PI adjustment time. The last PI adjustment time indicates when the PI value was last adjusted.

The control circuit is disposed at the central location and is coupled to the interface and the database. The control circuit is configured to obtain the PI value and the last PI adjustment time from the database. The control circuit is further configured to obtain the scans and analyze the scans to determine a back room quantity value for a selected product in the back room, and to compare the PI value of the selected product to the back room quantity value of the selected product, and determine a second time when the back room quantity value becomes greater than the PI value for the selected product.

The control circuit is still further configured to block an adjustment to the PI of the selected product when an indication of upcoming inventory adjustment for the selected product has been received at the interface. The control circuit is further configured to block the adjustment to the PI value of the selected product when the last PI adjustment time is after the second time.

The control circuit is configured to, when the back room quantity value is greater than the PI value and the adjustment to the PI value is unblocked, adjust the PI value to be the back room quantity value, and transmit the adjusted PI value to the retail store via the interface and network.

In aspects, the present approaches reduce the amount of products being ordered by retail stores. For example, the amount of particular products was reduced by around 50% over a 52 week period.

Referring now to FIG. 1, one example of a system 100 for adjusting the PI value of a selected product in a retail store 102 is described. The retail store 102 may be any type of retail store, for example, a discount center a grocery store, a department store, or a hardware store to mention a few examples.

The retail store includes a database 152 that stores for each product a PI value 122, a last PI adjustment time 120, and a back room quantity value 124. The PI value 122 for the selected product indicates the amount of a selected product in the retail store. The last PI adjustment time 120 indicates the last time when the PI value 122 was adjusted. The back room quantity value 124 indicates the amount of product in a back room 150. Sensors (e.g., cameras) 156 are disposed in the backroom. In aspects, the sensors 156 obtain images of the backroom. In other aspects, the images may be sent to the apparatus 106 for processing (e.g., determination of the backroom quantity value 124). In other examples, the backroom quantity value 124 is determined at the retail store 102 (e.g., by analyzing the images, or having an employee enter the value into the database 152).

A communication device 154 allows the retail store 102 to communicate with entities that are external to the store. The communication device 154 may be any combination of hardware or software that allows communications to be received at the retail store 102, and makes transmissions from the store 102. In one example, the communication device 154 may be a transceiver circuit. The communication device 154 may be deployed within or at another device (e.g., a modem, a smart phone, or a personal computer, to mention a few examples).

Cloud network 104 is coupled to the communication device 154 (e.g., a transceiver circuit) at the retail store 102. The cloud network 104 may be any type of computer or communication network and may include routers, gateways, and servers to mention a few examples of devices that can form or be utilized in the network 104. The cloud network may also be combinations of various types of networks.

The apparatus 106 includes an interface 130, a control circuit 132, and a database 134. In one example, the interface 130 is configured to receive from the retail store 102 the back room quantity value 124 for a selected product in the back room 150. In another example, the interface 130 receives scans from the backroom. The back room quantity value 124 is obtained from scans of the selected product by the sensors 156 in the back room 150 of the retail store.

In other aspects, the interface 130 is also configured to receive from the retail store the perpetual inventory (PI) value 122 associated with the selected product, and the last PI adjustment time 120 that indicates when the retail store 102 last adjusted the PI value. Alternatively, information from which the PI value 122 and the last PI adjustment time is received at the interface 130.

In aspects, the apparatus 106 may be disposed at a central processing center or location such as a business headquarters. In other examples, the apparatus 106 is disposed at one or more remote locations (e.g., retail stores). Advantageously, disposing the apparatus at a central processing center reduces data storage cost, since all data can be stored at a single location instead of at multiple locations. Consequently, the PI value may be calculated remotely at the retail store 102 or at the central processing center.

The database 134 stores the PI value 122, the back room quantity value 124, and the last PI adjustment time 120. The database 134 may be any type of memory storage device.

The control circuit 132 is coupled to the interface 130 and the database 134. The term control circuit refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 132 may be configured (for example, by using corresponding programming stored in a memory as will be well understood by those skilled in the art) to carry out one or more of the steps, actions, and/or functions described herein.

The control circuit 132 is configured to obtain the PI value 122, the back room quantity value 124, and the last PI adjustment time 120 from the database 134. The control circuit 132 is configured to compare the PI value 122 of the selected product to the back room quantity value 124 of the selected product, and to determine the time when the back room quantity value 124 becomes greater than the PI value 122 for the selected product.

The control circuit 132 is further configured to block an adjustment to the PI value of the selected product when an indication of upcoming inventory adjustment for the selected product has been received at the interface 130. The control circuit 132 is configured to block the adjustment to the PI value of the selected product when the last PI adjustment time is after the second time. When the back room quantity value 124 is greater than the PI value 122 and the adjustment to the PI value 122 is unblocked, the control circuit 132 is configured to adjust the PI value 122 to be the back room quantity value 124.

In other examples, PI adjustments by the control circuit 132 may also be blocked when adjustments have been blocked at other stores. In aspects, other stores may be under audit and the PI may be blocked at the current store as a precaution. In this way, the knowledge and experience of decisions made with respect to products at other stores may be applied to adjustments or proposed adjustments to the same or similar products at the current store. Blocking decisions made at other stores may be stored at the database 134 and used by the control circuit 132.

In aspects, the control circuit 132 is configured to transmit the adjusted PI value to the retail store 102. In other aspects, when the adjustment to the PI value is unblocked, the control circuit 132 sends a message to send at least some of the selected product to a distribution center or another retail store.

In other examples, when the adjustment to the PI value is unblocked, the control circuit 132 sends an alert message to a store employee. The alert may indicate an action for the employee to take or may be for informational purposes only.

It will be appreciated that the blocking of PI adjustments has the beneficial effect of increasing the confidence level of PI adjustments that are made. It will also be understood that in some examples all of the above-mentioned blocking steps may not need to be performed. In other words, in some examples, only a subset of all of the above-mentioned blocking steps need be performed.

In still other aspects, the retail store 102 sends information to the interface 130 as data records (which can be formatted in any type of data format or use any type of programming language and data structure). For example, a plurality of data records including PI values (or information formation from which PI values can be obtained) and the back room quantity values of products (or information such as scans from which back room quantity values can be derived) may be sent from the retail store 102. In some examples, the control circuit 132 only processes the data records in a batch mode, i.e., only after a number of records is received. The number may change over time or be fixed. In this way, the control circuit 132 need not process each record as or when it appears, but can wait for a more opportune time to process groups of records thereby increasing system efficiency.

Figure 2:
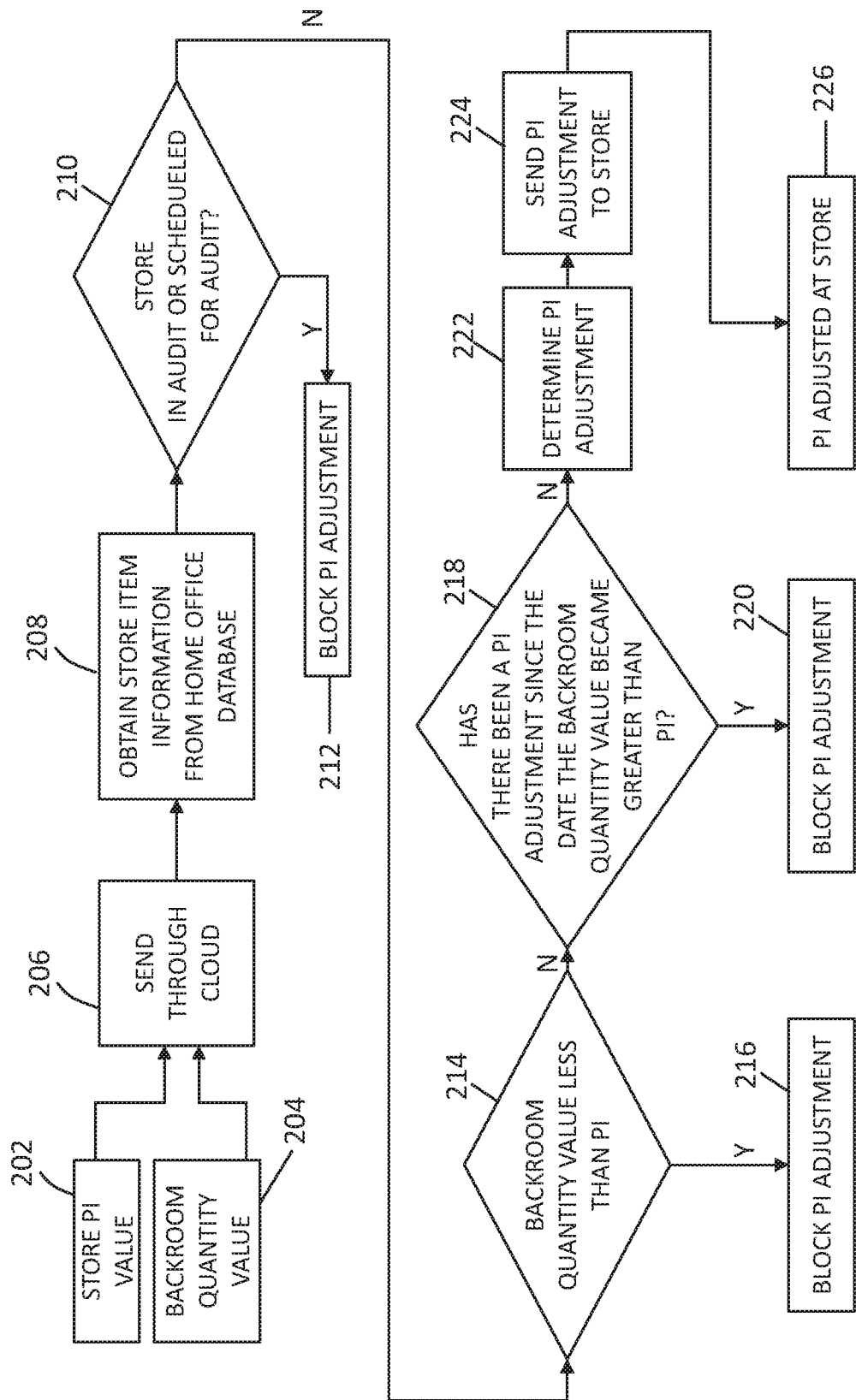
FIG. 2 is a flow chart of an approach for adjusting a PI value in accordance with some embodiments.

Referring now to FIG. 2, one example of managing the PI value for a retail store is described. In one example, the processing described with respect to FIG. 2 occurs at a central processing center. In other examples, the processing occurs at the retail store. As shown in FIG. 2, the PI value 202 for a product at the retail store (or information from which the PI value can be derived such as scanned or reported information of item availability from store employees) and a back room quantity value 204 (or information such as scans of the back room from which the back room quantity value can be determined) for the product (indicating the perceived availability of a product in the back room of the retail store) are sent through the cloud (or some other network or combination of networks) at step 206. At step 208, store item information is received from an outside source such as the home office interface. The item information may include whether the store is under an audit, or the last time the PI value for the product was adjusted.

At step 210, it is determined whether the store is under audit or whether there is an audit planned for the store. To make this determination, information can be received (from the retail store or from some other source) and analyzed. If the answer is affirmative, then the PI adjustment is blocked at step 212. By "blocked," it is meant that the PI value is not changed and execution of the algorithm shown in FIG. 2 is halted.

PI adjustments may also be blocked when adjustments have been blocked at other stores. In aspects, other stores may be under audit and the PI may be blocked at the current store as a precaution. In this way, the knowledge and experience of decisions made at other stores may be applied to adjustments or proposed adjustments at the current store.

If the answer at step 210 is negative, then at step 214 it is determined whether the back room quantity is less than the PI. If the answer is affirmative, then the PI adjustment is blocked at step 216.

If the answer at step 214 is negative, then at step 218, it is determined whether there has been a PI adjustment since the date or time the back room quantity value became greater than the PI. If the answer at step 218 is affirmative, then the PI value adjustment is blocked at step 220.

If the answer at step 218 is negative, then at step 222 a PI adjustment is determined. In one example, the PI value is adjusted to be equal to the back room quantity value. At step 224, the PI adjustment is sent to the retail store.

The PI value may also be adjusted to other values as well. For example, if information exists that other amounts of the product exist outside the back room (e.g., in another storage area), then the PI value may be adjusted to be the back room value plus an additional amount. At step 226, the PI is adjusted at the retail store by the PI adjustment. It will be appreciated that either a PI adjustment value (the amount the PI is to be adjusted by, up or down) or the actual adjusted PI value may be sent to the retail store.

Figure 3:
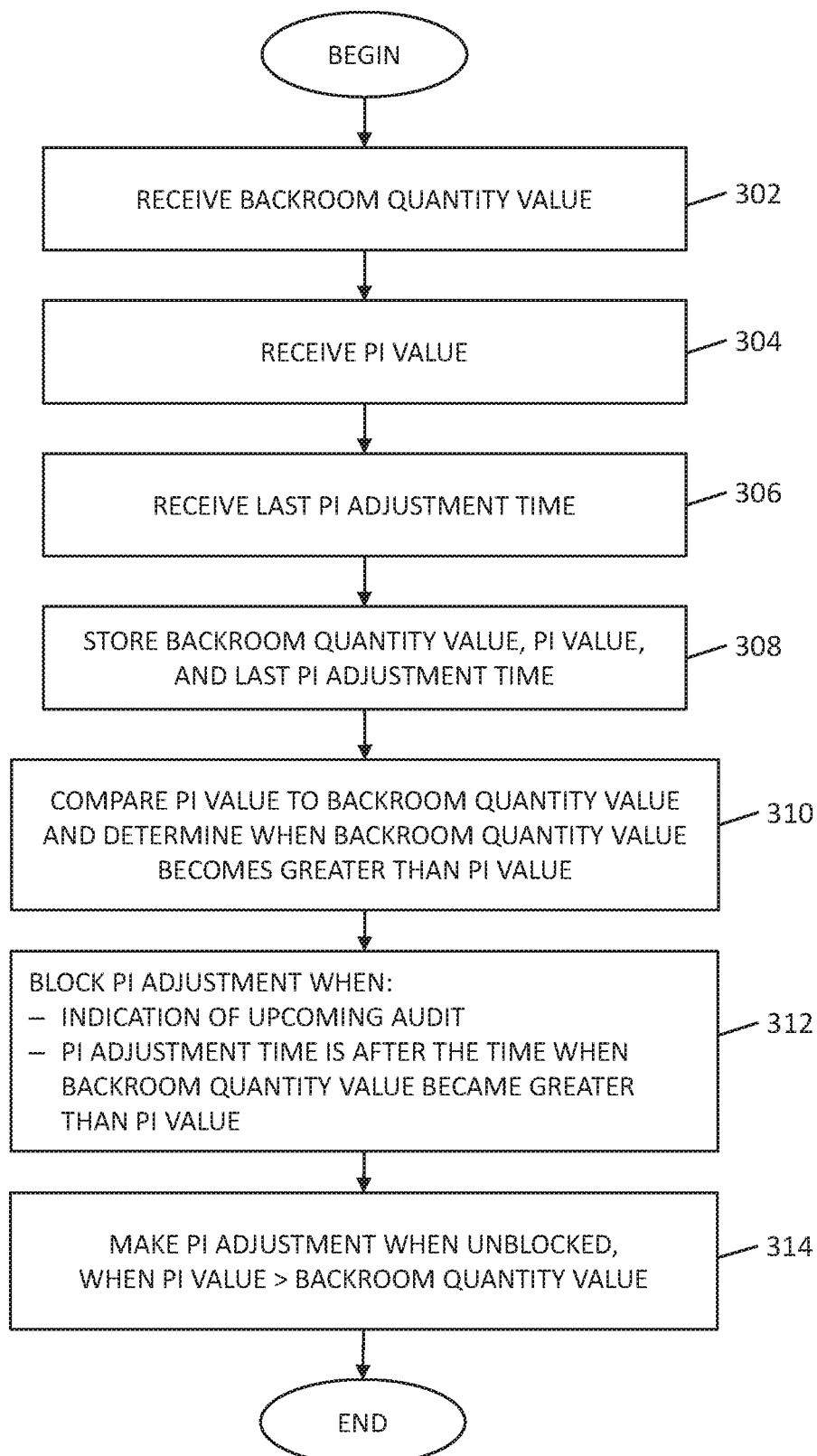
FIG. 3 is a flow chart of another approach for adjusting a PI value in accordance with some embodiments.

Referring now to FIG. 3, at step 302 a back room quantity value is received from a retail store. In one example, the processing described with respect to FIG. 2 occurs at a central processing center. In other examples, the processing occurs at the retail store. The back room quantity value represents the amount of a selected product in the back room. In other aspects, the back room quantity value is determined from scans of the selected product in the back room of the retail store. For example, cameras may obtain images of storage areas of the back room, and these images may be analyzed to determine the presence of a particular product. Products may also be configured with RFID tags, and RFID scanners can monitor for the presence of the tags (and hence the product) in the back room. As mentioned, the scans may be processed locally at the retail store or at a central processing center.

At step 304, a perpetual inventory (PI) value associated with the selected product is received from a retail store. In other examples, information from which the PI value may be determined is received. At step 306, the last PI adjustment time (that indicates when the retail store last adjusted the PI value) is received from the retail store.

At step 308, the back room quantity value, and the PI adjustment time are stored in a database. The database may be any type of memory storage device.

Subsequently, the PI value, the back room quantity value, and the last PI adjustment time are obtained from the database to be processed. At step 310, the PI value of the selected product is compared to the back room quantity value of the selected product, and a time when the back room quantity value becomes greater than the PI value for the selected product is also determined. The time when the back room quantity value become greater than the PI value may be determined a variety of different ways. For example, the back room quantity value (or information that can be used to determine the back room quantity value) may be periodically sent from the retail store and compared to the PI value. The time when the back room quantity value exceeds the PI value is recorded.

At step 312, determinations are made as to whether to block the PI adjustment. For example, an adjustment to the PI of the selected product is blocked when an indication of upcoming inventory adjustment for the selected product has been received. An adjustment to the PI value of the selected product is also blocked when the PI adjustment time is after the second time. Various combinations of conditions can be evaluated to determine whether to block the PI value. These conditions can be selected so as to maximize confidence that any changes to the PI value are accurate.

At step 314, when the back room quantity value is greater than the PI value and the adjustment to the PI value is unblocked, the PI value is adjusted to be the back room quantity value. It will be appreciated that either a PI adjustment value (the amount the PI is to be adjusted by, up or down) or the actual adjusted PI value may be sent to the retail store.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system that is configured to manage perpetual inventory (PI) values of products in a back room or other area of a retail store, the system comprising:
    one or more sensors disposed at the back room of a first retail store, the sensors being configured to obtain scans of products in the back room of the first retail store;
    a network coupled to the one or more sensors;
    a database configured to store a perpetual inventory (PI) value for the selected product, the scans, and a last PI adjustment time, the PI value being the amount of selected product in the first retail store;
    wherein the PI value changes as products are sold and physically removed by customers from shelving at the first retail store and as products physically arrive in a shipment at the first retail store, wherein the last PI adjustment time is measured from any time when the products were sold and removed from the first retail store and when the shipment arrived;
    a control circuit and coupled to the network and the database, the control circuit including a processing device and being configured to execute computer instructions on the processing device, the computer instructions being effective to:
        obtain the PI value and the last PI adjustment time from the database;
        obtain the scans and analyze the scans to determine a back room quantity value for a selected product in the back room, wherein the back room quantity value indicates the amount of the selected product in the back room;
        compare the PI value of the selected product to the back room quantity value of the selected product, and determine a time when the back room quantity value becomes greater than the PI value for the selected product;
        block the adjustment to the PI value of the selected product when the last PI adjustment time is after the time;
        when the back room quantity value is greater than the PI value and the adjustment to the PI value is unblocked, adjust the PI value to be the back room quantity value, and transmit the adjusted PI value to the first retail store via the network;
    wherein the PI value is utilized to order products for the first retail store and the products are shipped to the first retail store.

2. The system of claim 1, wherein the computer instructions are effective to, when a PI adjustment for the selected product has been blocked in a second retail store because of an audit, block the PI adjustment for the selected product in the first retail store.

3. The system of claim 1, wherein when the adjustment to the PI value is unblocked, the control circuit sends a message to send at least some of the selected product to a distribution center or another retail store.

4. The system of claim 1, wherein when the adjustment to the PI value is unblocked, the control circuit sends an alert message to a store employee.

5. The system of claim 1, wherein the first retail store sends a plurality of data records including PI values and back room quantity value of products.

6. The system of claim 5, wherein the control circuit only processes the records after a predetermined number of records is received.

7. The system of claim 6, wherein the number changes over time.

8. The system of claim 6, wherein the number is fixed.

9. A method for managing perpetual inventory (PI) values of products in a back room or other area of a retail store, the back room not being accessible to the general public, the method comprising:

obtaining product scans of products by one or more sensors at a first retail store, the products being disposed at a back room of the first retail store;

transmitting the scans from the first retail store to a database via a network;

storing in the database a perpetual inventory (PI) value for a selected product, the scans, and a last PI adjustment time, the PI value being the amount of selected product in the first retail store;

wherein the PI value changes as products are sold and physically removed by customers from shelving at the first retail store and as products physically arrive in a shipment at the first retail store, wherein the last PI adjustment time is measured from any time when the products were sold and removed from the first retail store and when the shipment arrived;

at a control circuit, the control circuit including a processing device and being configured to execute computer instructions on the processing device, the computer instructions:

obtaining the PI value and the last PI adjustment time from the database, obtaining the scans and analyzing the scans to determine a back room quantity value for a selected product in the back room;

comparing the PI value of the selected product to the back room quantity value of the selected product, and determining a time when the back room quantity value becomes greater than the PI value for the selected product, wherein the back room quantity indicates the amount of the selected product in the back room;

blocking the adjustment to the PI value of the selected product when the last PI adjustment time is after the time;

when the back room quantity value is greater than the PI value and the adjustment to the PI value is unblocked, adjusting the PI value to be the back room quantity value, and transmitting the adjusted PI value to the first retail store via the network;

wherein the PI value is utilized to order products for the first retail store and the products are shipped to the first retail store.

10. The method of claim 9, further comprising, when a PI adjustment for the selected product has been blocked in a second retail store because of an audit, the control circuit blocks the PI adjustment for the selected product in the first retail store.

11. The method of claim 9, wherein when the adjustment to the PI value is unblocked, the control circuit sends a message to send at least some of the selected product to a distribution center or another retail store.

12. The method of claim 9, wherein when the adjustment to the PI value is unblocked, the control circuit sends an alert message to a store employee.

13. The method of claim 9, wherein the first retail store sends a plurality of data records including PI values and back room quantity value of products.

14. The method of claim 13, wherein the control circuit only processes the records after a predetermined number of records is received.

15. The method of claim 14, wherein the number changes over time.

16. The method of claim 14, wherein the number is fixed.

* * * * *